(No Model.) 2 Sheets—Sheet 1.

O. OHLSSON.
CENTRIFUGAL CREAMER.

No. 519,070. Patented May 1, 1894.

Witnesses  
Wm Smith  
Frank Vliet

Inventor:  
Olof Ohlsson,  
By Drake & Co Atty's.

THE NATIONAL LITHOGRAPHING COMPANY,
WASHINGTON, D. C.

(No Model.) 2 Sheets—Sheet 2.
O. OHLSSON.
CENTRIFUGAL CREAMER.

No. 519,070. Patented May 1, 1894.

Witnesses
Robert Soelberger
Jas. H. Griffin

Inventor
Olof Ohlsson,
By Drake & Co., Atty's.

UNITED STATES PATENT OFFICE.

OLOF OHLSSON, OF NEWARK, NEW JERSEY, ASSIGNOR TO THE UNITED STATES BUTTER EXTRACTOR COMPANY OF NEW JERSEY, OF NEW JERSEY.

CENTRIFUGAL CREAMER.

SPECIFICATION forming part of Letters Patent No. 519,070, dated May 1, 1894.

Application filed January 21, 1893. Serial No. 459,132. (No model.)

*To all whom it may concern:*

Be it known that I, OLOF OHLSSON, a subject of the King of Sweden and Norway, residing at Newark, in the county of Essex and State of New Jersey, have invented certain new and useful Improvements in Centrifugal Creamers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to reduce the cost of construction, to enable the machine to be cleansed with greater facility, to increase the capacity of the machine, to improve the quality of the cream by obtaining a purer or "heavier" article, to prevent the cream globules that are small and hard to separate from being carried out from the machine by the body of skim milk, and to secure other advantages and results, some of which will be referred to in connection with the description of the working parts.

The invention consists in the improved centrifugal machine, in the arrangements and combinations of parts thereof, all substantially as will be hereinafter set forth and finally embodied in the claims.

Figure 1:
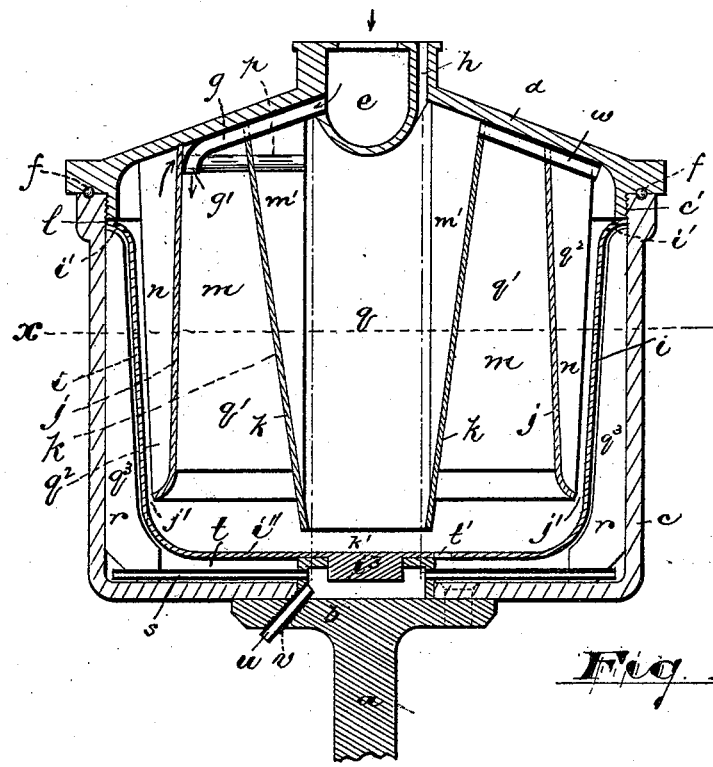
Figure 2:
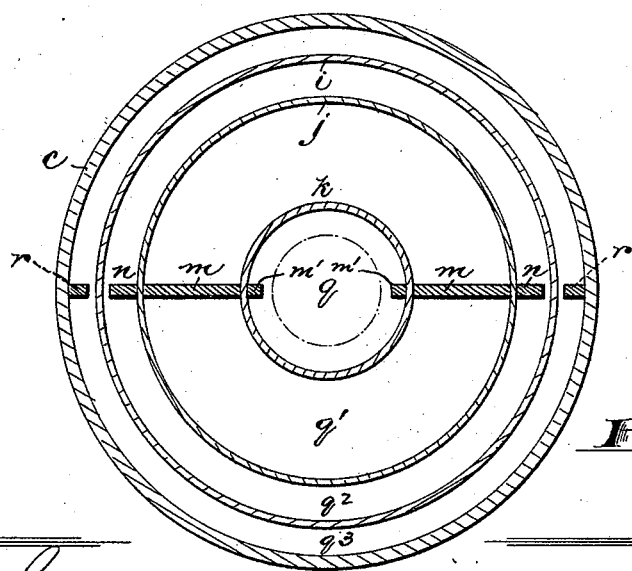
Figure 3:
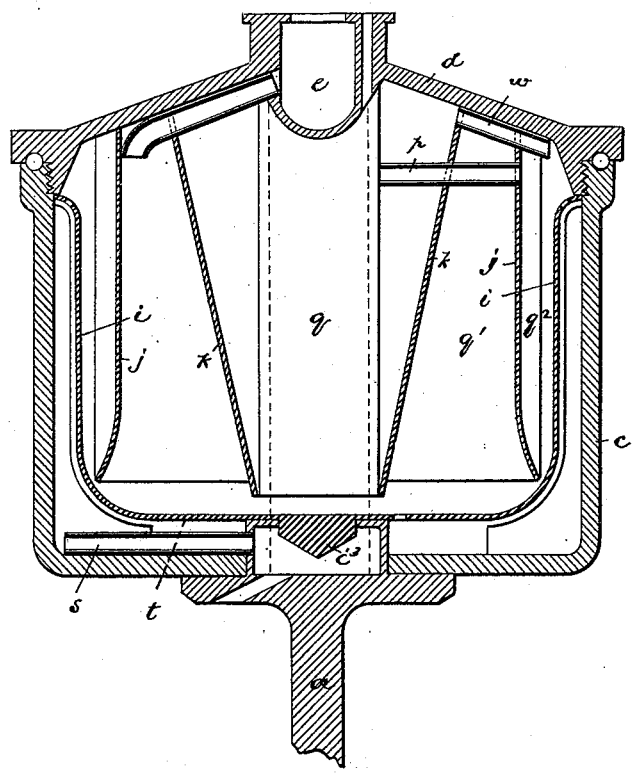

Referring to the accompanying drawings in which like letters indicate corresponding parts in each of the views, Figure 1 is a central vertical section of the rotary bowl of the machine showing the interior arrangement of parts which serve to produce the desired results, and Fig. 2 is a cross-section of the bowl taken on line $x$. Fig. 3 is a central vertical section showing a construction having certain vertical partitions.

In the drawings, $a$ indicates a rotary shaft having suitable bearings and means for rotating the said shaft at a high rate of speed, the said bearings and rotating means not being shown, the same being of any ordinary construction. At the upper end a seat, $b$, is formed on or secured to said shaft to receive the bowl $c$, which is preferably of cast iron or steel. Said bowl is fastened in place in any manner and, at the upper edges, on the interior side, it is provided with screw threads, as at $c'$, to receive co-operating threads on a cover $d$. The cover closes the bowl and makes therewith the separating chamber. A packing, $f$, may be employed to prevent leakage at the joint. The cover is provided at the center with a receptacle, $e$, for the milk from which it is fed to the separating chamber through an outwardly extending tube, $g$, which is preferably secured to the under side of the cover and conducts the milk to a point in the upper part of the main chamber about midway between the axial center and the periphery. At one side of the receptacle, the cover is provided with a cream exit opening $h$, which is located in line with the desired cream wall and communicates with any suitable receptacle or pan, not shown, for the cream, in any desirable manner. The said main chamber is divided by vertical, or approximately vertical, partitions $i$, $j$ and $k$, into a series of separating chambers $q$, $q'$, $q^2$, $q^3$, which extend from top to bottom of the bowl or approximately so, the said partitions, each at one end, being open to allow the fluid to pass from one side thereof to the other, the said opening or passage being either a perforation such as $i'$, or an annular opening between the partition and the bottom as at $j'$ or any other form of opening or passage. Certain of the partitions, $j$, $k$, for example, are secured to the cover, $d$, and are removable from the bowl therewith, while another of said partitions, as $i$, extends downward to and is supported by the bottom of the bowl, being preferably clamped and held in place by the cover which engages the upper edge as at $l$. The partitions, or the side walls of the chambers, are preferably inclined toward the respective exit openings therethrough for the lighter and heavier products of centrifugal separating action, the partition, $j$, for example, in the inner chamber or compartment $q'$ (which is virtually a subdivision of the larger chamber $q$, $q'$, the action of the machine being effective and clearly the same if the partition, $k$, be removed) being inclined outwardly toward the skim or blue milk passage or duct $j'$ and the outer side, in the chamber, compartment or subdivision, $q^2$, being inclined slightly toward the cream tube or duct, $p$, to facilitate the flow of cream to tube or duct. The partition, $i$, is likewise inclined and the inner and outer walls oppositely inclined toward the respective cream and blue or skim milk ducts or passages.

In referring to the partitions as vertical, I do so in a free sense, the partitions approximating a close parallelism with the axial center of the bowl but preferably having a sufficient inclination to secure an easy flow in the directions desired.

The relations of the inlet, $g'$, for the milk with the passages $j'$, $i'$, of the partitions are such as that the milk will, under centrifugal force, be compelled to traverse the full vertical length of the bowl, or as nearly so as possible, from said inlet, then pass outward under the middle partition $j$, as at $j'$, then in the chamber, $q^2$, to again traverse, in a return direction, the full length of the bowl to the opening or passage, $i'$, then at or near the periphery of the bowl, make another vertical passage through the chamber, $q^3$, the fluid at this point or position containing the particles of cream that are hard to separate but which are here separated because of the separating force being strongest.

The preferred peculiar construction of the outermost partition, $i$, is shown in Fig. 1, where it is shown to resemble a cup, approximately conforming to the outline of the bowl, $c$, but sufficiently smaller to form the chamber, $q^3$, between it and said bowl at the side and a cream passage, $t$, between the bottom $i''$ and the bottom of the bowl. The said bottom is perforated, as at $t'$, at a point approximating the chamber, $q$, so that the cream, following down the outer sides of the cup-shaped partition, will flow through said perforation into the cream chamber. The cup-shaped partition is preferably seated upon a raised and hollow bearing of the seat $b$, which is centrally open to receive the boss, $i^3$, on the under side of the cup-shaped partition, said boss serving to prevent lateral displacement.

The chambers are provided with wings, such as $m$, $n$, $m'$, $r$, which serve to impart the desired rotary and centrifugal action to the fluid. The central or cream chamber, $q$, has an open communication with the next outer chamber, $q'$, through the opening or passage, $k'$, and is thus adapted to receive the cream therefrom and is also provided at another point with an exit opening, $w$, to allow an outflow of skim milk, this passage, $w$, extending preferably to the outer part of the chamber, $q^2$, where any cream remaining in the milk from the chamber, $q$, will be given an opportunity for separation before the fluid passes from the machine. The partition, $k$, is preferably funnel-shaped being smaller at the cream inlet, $k'$, and larger at the skim milk outlet, $w$, so that the skim milk will flow in the direction of said skim milk outlet. The inlets $k'$ and the outlets $h$ and $w$ are at opposite ends of the chamber, $q$, so that the fluid travels the whole length and is thus given a full opportunity to separate into its heavier and lighter components.

Outside of and around the cream chamber, $q$, is what we may term the milk-reception chamber, $q'$. This receives the milk from the receptacle, $e$, through the tube, $g$, at one end and after compelling a vertical course from top to bottom thereof delivers the more or less perfectly separated cream to the cream chamber and skim milk to the next outer chamber, $q^2$, through the passage $j'$. This said outer chamber, $q^2$, is at its end opposite its inlet passage $j'$ provided with cream and skim milk exits $p$ and $i'$, the first of said exits being through a tube which extends directly from the chamber, $q^2$, through the chamber $q'$ to the chamber $q$. The exit, $i'$, for the skim milk communicates with the outermost chamber, $q^3$, at the periphery of the bowl where the centrifugal force is the greatest. The chamber which is comparatively narrow is also provided with exits at the end opposite that having the inlet $i$, the exit, $t'$, in the bottom, $t$, being for the cream and the exit, $s$, consisting of a tube arranged radially at the bottom of the bowl, $c$, and extending from a point close to the inner wall of said bowl to the exit opening, $u$, from which the skim milk may flow out to any suitable receptacle.

The regulation of the outflow of skim milk and the location of the cream wall with respect to the cream exit, or the admixture of skim milk with the cream passing out of said cream exit may be controlled by the hollow screw, $v$, having the skim milk passage $u$. Said screw extends through the bowl at an inclination to the line of the cream wall, so that a turn or a part of a turn of the screw will not produce a radical change in the location of the inner end of the outflow-passage $u$. Thus a nice adjustment may be readily made.

In operating the invention, the milk, having been poured into the receptacle, $e$, flows through the tube or passage, $g$, to the milk-reception chamber, $q'$, where, under centrifugal pressure, it is forced to flow downward across the lines of centrifugal force so that the lighter cream tends to flow toward the center of the bowl and the skim milk toward the periphery. At the lower part of said chamber, $q'$, the easily separated cream flows inward through the passage $k'$ and enters the cream chamber, $q$, while the skim milk, still containing the less easily separated particles of cream enters at one end of the outer chamber, $q^2$, and again takes a vertical course in a return direction. Here increased centrifugal pressure is exerted to separate the less easily separable particles or globules. From this chamber, also, the cream is directed to the central chamber and the skim milk to another outer chamber where it takes another and final vertical course at the peripheral part of the main chamber where the centrifugal force is greatest. The said skim milk which now contains only small globules, or those hard to separate, is, in this chamber, in a comparatively thin body because of the narrowness of the chamber, $q^3$, and the fluid is under the best conditions for separation. Here the cream, following the partition $i$, passes downward and inward through passages $t$, $t'$, to the cream chamber $q$, while the skim milk, voided of its cream, passes through the tube or tubes, $s$, and out from the machine.

I am aware that various changes may be made in the construction of the bowl and its interior parts or mechanical contents without departing from the spirit and scope of the invention and I do not wish to be understood in this specification as limiting myself by the positive terms of description to the constructions described excepting as I may be limited by the state of the art antedating my invention.

Having thus described the invention, what I claim as new is—

1. In a centrifugal creamer, the combination with the rotary bowl $c$, of a cup-shaped partition $i$, removable from said bowl, and a cover $d$, having partitions removable from the bowl $c$, therewith, said cup-shaped partition and partitions of the cover forming chambers or compartments in the main chamber of the bowl, said partitions being provided with ducts or passages for the milk, cream and skim milk, all substantially as and for the purposes set forth.

2. In a centrifugal creamer, the combination with the rotary bowl and its cover, of partitions $j$ and $i$, inclined oppositely, the outer walls of said partitions being inclined toward passages $p$ and $t'$, leading to the center of the main chamber, and the inner walls of said partitions being outwardly inclined toward outwardly extending blue or skim milk passages or ducts $j'$, $i'$, substantially as set forth.

3. In a centrifugal creamer, the combination with the rotary bowl and its cover, of partitions $i, j$, having oppositely inclined side walls and passages or openings therethrough for the cream and skim-milk, the inner walls being inclined toward the skim milk passages and the outer walls to the cream passages, one of said partitions being secured to the cover and being removable therewith and the other resting in the bowl, $c$, and being removable from said bowl, substantially as set forth.

4. In a centrifugal creamer, the combination with the centrifugal bowl and its cover, of a plurality of partitions arranged one within the other and forming a series of vertical chambers or compartments which extend from one end of the bowl to the other as shown, wings for imparting rotary movement to the fluid, inlet ducts for the milk or unseparated fluid to the bowl, exit ducts for the partially separated skim or blue from the inner chambers to the outer chambers of the series and cream inlet ducts from each of the outer chambers to the inner chamber, substantially as set forth.

5. In a centrifugal creamer, the combination with the centrifugal bowl, $c$, of a cover, $d$, having a partition, $j$, extending down from the said cover and forming inner and outer compartments, and a partition, $i$, extending from the bottom upward and subdividing the outer chamber, the said partitions $i$ and $j$ forming a series of cream separating chambers, and each having ducts or passages for leading the blue or partly separated fluid outward from the inner to the next outer chamber and with ducts or passages leading inward from the outer chamber to the cream chamber at the center, and means for supplying the creamer with the unseparated fluid, substantially as set forth.

6. The combination with the partitions $i$ and $j$, extending upward through the bowl of a centrifugal creamer and forming a series of chambers $q'$, $q^2$, $q^3$, therein, of a tube, $p$, extending through the partition, $j$, and leading the cream from the chamber, $q^2$, to the cream wall, a duct leading the blue milk from the inner chamber, $q'$, to the chamber, $q^2$, and from the chamber $q^2$, to the chamber $q^3$, ducts for leading the cream from the chamber, $q^3$, to the cream wall, and ducts for conveying the unseparated fluid to the creaming chambers and for leading blue milk from the machine, substantially as set forth.

7. In combination with the bowl of a centrifugal creamer, and its cover, a plurality of partitions concentrically arranged, one within the other, and having alternating bluemilk eduction passages, and inwardly-leading cream passages from each of the chambers formed by said partitions substantially as set forth.

In testimony that I claim the foregoing I have hereunto set my hand this 17th day of January, 1893.

OLOF OHLSSON.

Witnesses:
 CHARLES H. PELL,
 OSCAR A. MICHEL.